United States Patent
Rivet

(10) Patent No.: US 10,273,889 B2
(45) Date of Patent: Apr. 30, 2019

(54) POSITIVE AIR SHUTOFF VALVE MAINTENANCE

(71) Applicant: Darren Rivet, Edmonton (CA)

(72) Inventor: Darren Rivet, Edmonton (CA)

(*) Notice: Subject to any disclaimer, the term of this patent is extended or adjusted under 35 U.S.C. 154(b) by 0 days.

(21) Appl. No.: 15/418,338

(22) Filed: Jan. 27, 2017

(65) Prior Publication Data
US 2017/0218859 A1    Aug. 3, 2017

Related U.S. Application Data

(60) Provisional application No. 62/288,970, filed on Jan. 29, 2016.

(51) Int. Cl.
| F02D 1/00 | (2006.01) |
| F02D 41/00 | (2006.01) |
| F02D 17/04 | (2006.01) |
| F02D 41/04 | (2006.01) |
| F02D 41/22 | (2006.01) |
| F02B 77/00 | (2006.01) |
| F02D 9/02 | (2006.01) |

(52) U.S. Cl.
CPC ......... *F02D 41/0002* (2013.01); *F02D 17/04* (2013.01); *F02D 41/042* (2013.01); *F02D 41/221* (2013.01); *F02D 2009/0245* (2013.01)

(58) Field of Classification Search
CPC ...... F02D 11/107; F02D 17/04; F02D 41/042; F02D 41/22; F02D 41/221; F02D 41/222; F02D 19/0681; B60K 28/00; F01P 11/14
USPC ........ 123/337, 339.15, 397, 399, 400, 198 D
See application file for complete search history.

(56) References Cited

U.S. PATENT DOCUMENTS

| 2004/0016416 A1* | 1/2004 | Ichihara | F02D 9/02 123/302 |
| 2007/0186901 A1* | 8/2007 | Rivet | F02D 9/107 123/403 |
| 2007/0227511 A1* | 10/2007 | Hazama | F02M 37/0029 123/514 |
| 2014/0048040 A1* | 2/2014 | Rivet | F02D 45/00 123/434 |
| 2015/0027553 A1* | 1/2015 | Myer | F01N 3/2066 137/13 |

* cited by examiner

*Primary Examiner* — John Kwon
(74) *Attorney, Agent, or Firm* — Bennett Jones LLP

(57) ABSTRACT

A method and system of periodically cycling an air shutoff valve, upon a pre-determined length of time elapsing since the last valve cycle; or upon the cumulative run time of an engine since the last valve cycle exceeding a pre-determined value.

11 Claims, 3 Drawing Sheets

POSITIVE AIR SHUTOFF VALVE MAINTENANCE

FIELD OF THE INVENTION

This invention relates to systems and methods of maintaining positive air shutoff valves.

BACKGROUND

In industrial environments such as agriculture, mining, transportation, petrochemical drilling operations, pipeline facilities, fuel transfer facilities, or material processing plants, the atmosphere may become contaminated with airborne fuels due to leaks or spills. Airborne fuels constitute any readily vaporized, aerosolized or suspended particles of a combustible material or hydrocarbon. Exposure of an operating engine to airborne fuels is potentially hazardous, since an engine ingesting airborne fuels may run uncontrollably even if its normal fuel source is disabled, thus preventing the engine from being normally shut off. Continuous operation of the engine may trigger fires or explosions, or result in engine damage caused by improper fuel types or above-speed operation.

Compression-ignition or conventional diesel engines are particularly susceptible to this problem, since combustion is initiated by compression of the air fuel mixture in the cylinders rather than by a spark. In contrast to a spark-ignition engine, a compression ignition engine does not use a throttle valve to control intake air flow and engine speed; thus, intake air flow is typically unrestricted. Engine speed is normally controlled by adjusting the rate at which fuel is fed to the cylinders, and the engine is stopped by cutting off fuel flow. The engine can run on a wide variety of fuels including diesel, methane, natural gas, propane, gasoline, aviation fuel, aerosolized oil, $H_2S$, grain dust, metal dust and coal dust. The engine continues to run as long as it is provided with fuel and air. If the engine is exposed to an environment where fuel is supplied to the engine externally (other than through the engine's controlled fuel system), any positive control over the engine speed may be lost. Even if the operator attempts to shut off the engine by cutting off the flow of regular fuel, the engine may run uncontrollably on the external fuel source until it is damaged or fails, possibly triggering an explosion in the rich fuel-air environment.

Positive air shutoff valves are provided to provide the ability to shut down an engine, particularly a compression-ignition engine, in routine or emergency situations. However, such valves are known to experience build-up of carbon or other deposits, which could interfere with their operation. Regular cycling of such valves is typically scheduled as part of routine maintenance. However, regular maintenance is sometimes difficult or inconvenient to perform.

SUMMARY OF THE INVENTION

The present invention comprises a method and system of cycling an air shutoff valve when specific actuation criteria are met. This will assist with on-going maintenance of the valve to remove contaminants that are wedged, pinched or otherwise trapped on the valve without interference to the operation of the vehicle.

In one aspect, the invention may comprise a method of periodically cycling an air shutoff valve, if either:

1. a pre-determined length of time has elapsed since the last valve cycle; or 2. the cumulative run time of an engine since the last valve cycle exceeds a pre-determined value.

In one embodiment, the method comprises the steps of checking both the elapsed time and the cumulative run time and cycling the valve if either condition is met, or both conditions are met. In one embodiment, the method comprises the further step of confirming the engine is not running and that a battery voltage is sufficient before cycling the valve.

In one embodiment, the valve may be automatically cycled by the system, or a user may be prompted to manually cycle the valve.

In another aspect, the invention comprises a valve controller connected to an air shutoff valve, the controller being connected to at least one sensor, an elapsed time clock and an engine run time clock, the controller programmed to cycle the valve if a pre-determined length of time has elapsed since the last valve cycle; or if the cumulative run time of an engine since the last valve cycle exceeds a pre-determined value. In one embodiment, the controller is programmed to cycle the valve only if the at least one sensor indicates that the engine is not running and if a battery voltage is sufficient.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
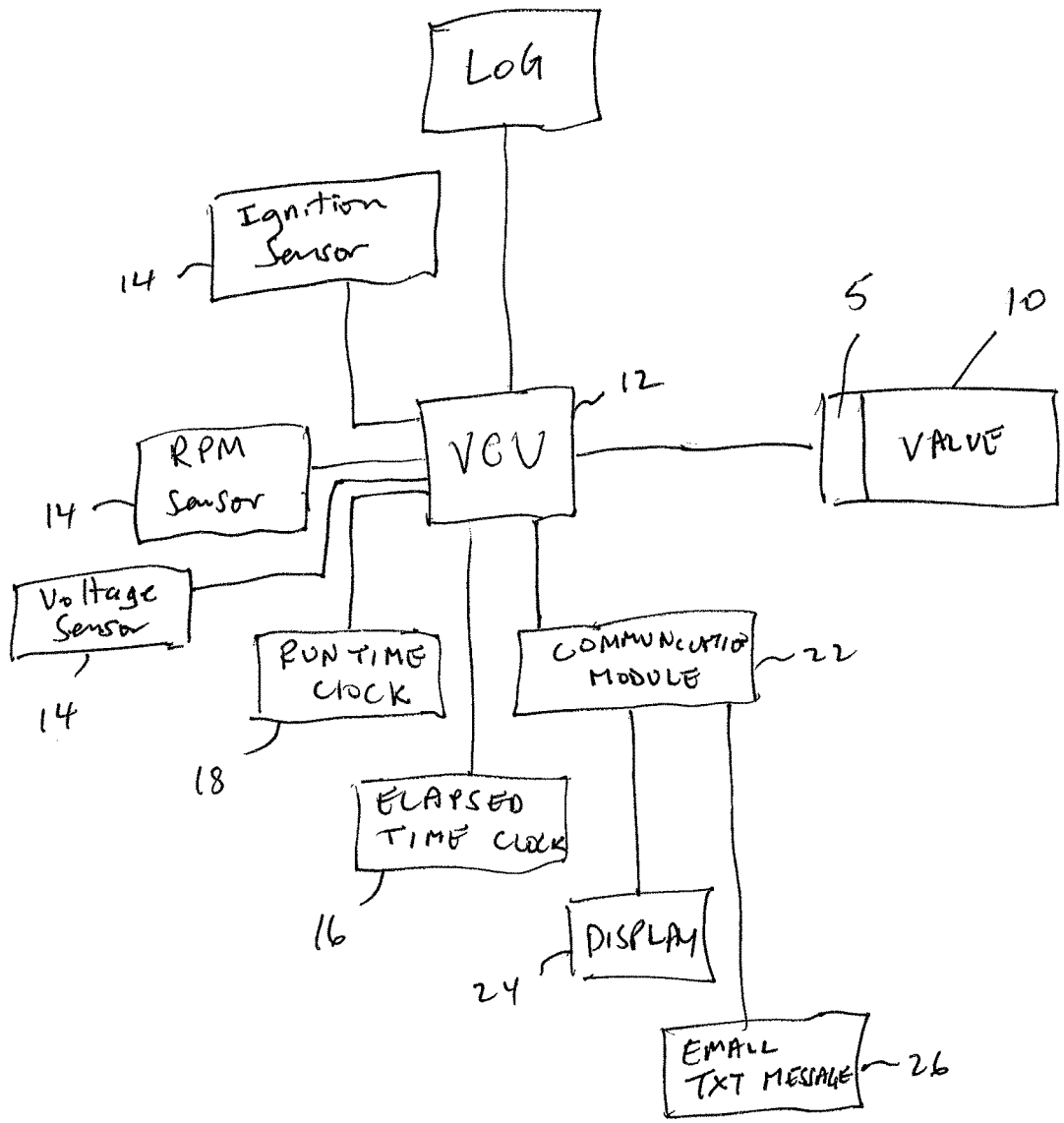
FIG. 1 shows a schematic configuration of one embodiment of a system of the present invention.

The present invention comprises a method and system for maintenance of a positive air shutoff valve.

In one embodiment, the system comprises an automated system comprising a controller or valve control unit or VCU (12) which is operably connected to the actuation mechanism (5) for a positive air shutoff valve (10) on an engine. The controller is also operably connected to a plurality of sensors (14) relevant to periodic operation of the valve (10) which may comprise an RPM sensor, an ignition switch sensor, a battery voltage sensor, or any other engine or vehicle sensor which monitors a condition relevant to valve operation and maintenance. The controller (12) may comprise or be connected to an elapsed time clock or timer (16), and/or an engine run time clock (18).

In one embodiment, controller comprises an event log (20) which records the cycling or attempted cycling of the valve, and optionally, displays a message or notifies a user of such successful or unsuccessful actuation of the valve. In one embodiment, in the event of an unsuccessful valve actuation, the controller may be adapted to prevent engine operation and/or to display or transmit a message to a user.

In this regard, the controller (12) may comprise a communication module (22) for sending or receiving data or information. The communication module may send a notification to be shown on a display (24), or transmit an electronic message (26) such as an email or a text message. The communication module may communicate by a wired or wireless means, using any standard connection, including WiFi, Bluetooth or cellular communication.

The actuation mechanism (5) may be any motorized mechanism for at least partially opening or closing the valve (10), such as an electric motor, an electrolinear actuator, a hydraulic mechanism, or the like.

The controller (12) is programmable to activate the actuation mechanism when a valve cycling event has occurred. The valve cycling event may comprise one of the following:
1. elapsed time from the last valve cycle; or
2. a minimum value of cumulative run time of the engine since the last valve cycle.

In one embodiment, the controller checks at least both elapsed time and engine run time to determine if the valve should be cycled.

As used herein, a "cycle" or "cycling" of the valve shall mean the movement of the valve through at least a portion of its range of motion, such as from closed to open to closed again, or from open to closed to open again.

In one embodiment, such as in the case of a vehicle, the controller is adapted to cycle the valve automatically on a periodic basis after operation of the vehicle. For example, the controller may be programmed to run through its checks once operation of the vehicle has been initiated. For example, the controller may sense the start of an ignition process (A), such as by the insertion of a key into the ignition or the detection of a key using RFID or similar tag technology. At that time, the controller may check to see if the engine is running (step 100) by checking either the presence of RPM or the position of the key in its "ignition" position.

Preferably, the controller will check both to ensure it is certain whether the engine is running or not. This check may be periodically repeated if the engine is running.

If the engine is not running, then the controller may then check the battery voltage (step 102). If the battery voltage is below a threshold value, for example 9.0 V in a 12 V system, then the controller may disable all checks and/or shut down to prevent draining the battery further. If the battery voltage is above the threshold value, then the controller may then check an elapsed time clock (step 104) to determine the elapsed time since the last valve cycle. If the elapsed time is less than a threshold value, for example 24 hours, then the controller check process has finished, and the controller check process may be logged into a log.

If the elapsed time is greater than the threshold value, then the controller may cause the valve to cycle (step 108). In one embodiment, the controller may check to see how long the engine has been off (step 106), and delay the valve cycle until some time after engine shutdown, preferably at least about 5-10 minutes after engine shutdown. The controller may then check to see if the valve has in fact cycled (step 110).

If the valve has in fact cycled, then the cycle event may be recorded in a log, and the elapsed time clock reset to zero. If the valve failed to cycle, then the failure may be noted in the log, and a notification may be displayed or transmitted to a user.

In one embodiment, the controller is adapted to cycle the valve automatically even if the engine has not been started or ran over an extended period of time. This process may be parallel or redundant to the periodic cycling initiated by the operation of the vehicle. For example, the controller may check periodically (B) the elapsed time since the last valve cycle (200). If the elapsed time exceeds a threshold value, for example 1 week, then the controller may cycle the valve (206) after verifying that the engine is not running (202) by checking either or both the RPM sensor and the ignition key position sensor, and verifying sufficient battery voltage (204). Once the valve is cycled in this case, the elapsed time counter is again reset, and the successful valve cycle may be noted in the log, and/or a notification may be displayed or transmitted to a user. Or an unsuccessful valve cycle attempt may be noted in the log, and/or a notification may be displayed or transmitted to a user. The notification regarding a successful or unsuccessful valve cycle attempt may be displayed again when the user initiated process commences (A).

In one embodiment, the process and system may be adapted to operate with an engine which is intended to run for lengthy continuous periods of time, such as an engine attached to a generator or a compressor. In such an example, the engine is typically maintained on a regular basis, such as an oil change every 48 hours or so. In one embodiment, the controller may close the valve (step 300) to prevent engine operation while the engine maintenance takes place. Alternatively, or in addition, the controller may disable or disconnect the engine starter to prevent engine operation. When the user then moves to restart the engine (302), such as by inserting a key in the ignition, the controller may then check the run time clock (304) to determine total running hours since the last valve cycle. If the total running hours exceeds a predetermined value, for example 250 hours, then the controller may cycle the valve or prompt the user to manually cycle the valve (306). If the valve cycled properly, the run time clock is then reset to zero (308), the valve cycle event may be logged (310) and the valve is opened (312) to allow the engine to start and run.

Figure 2:
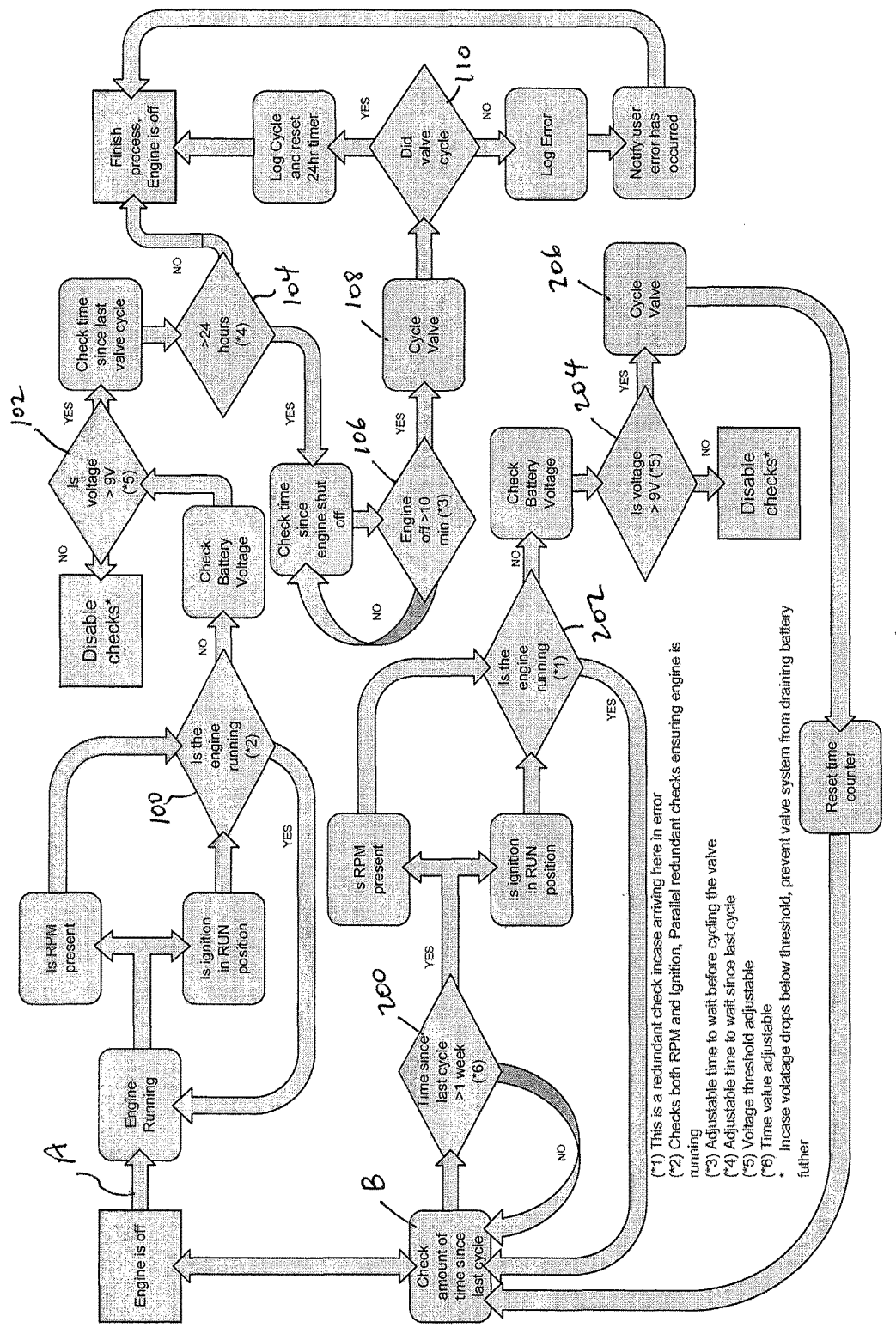
FIG. 2 shows a schematic flowchart of one embodiment of a method of the present invention.
Figure 3:
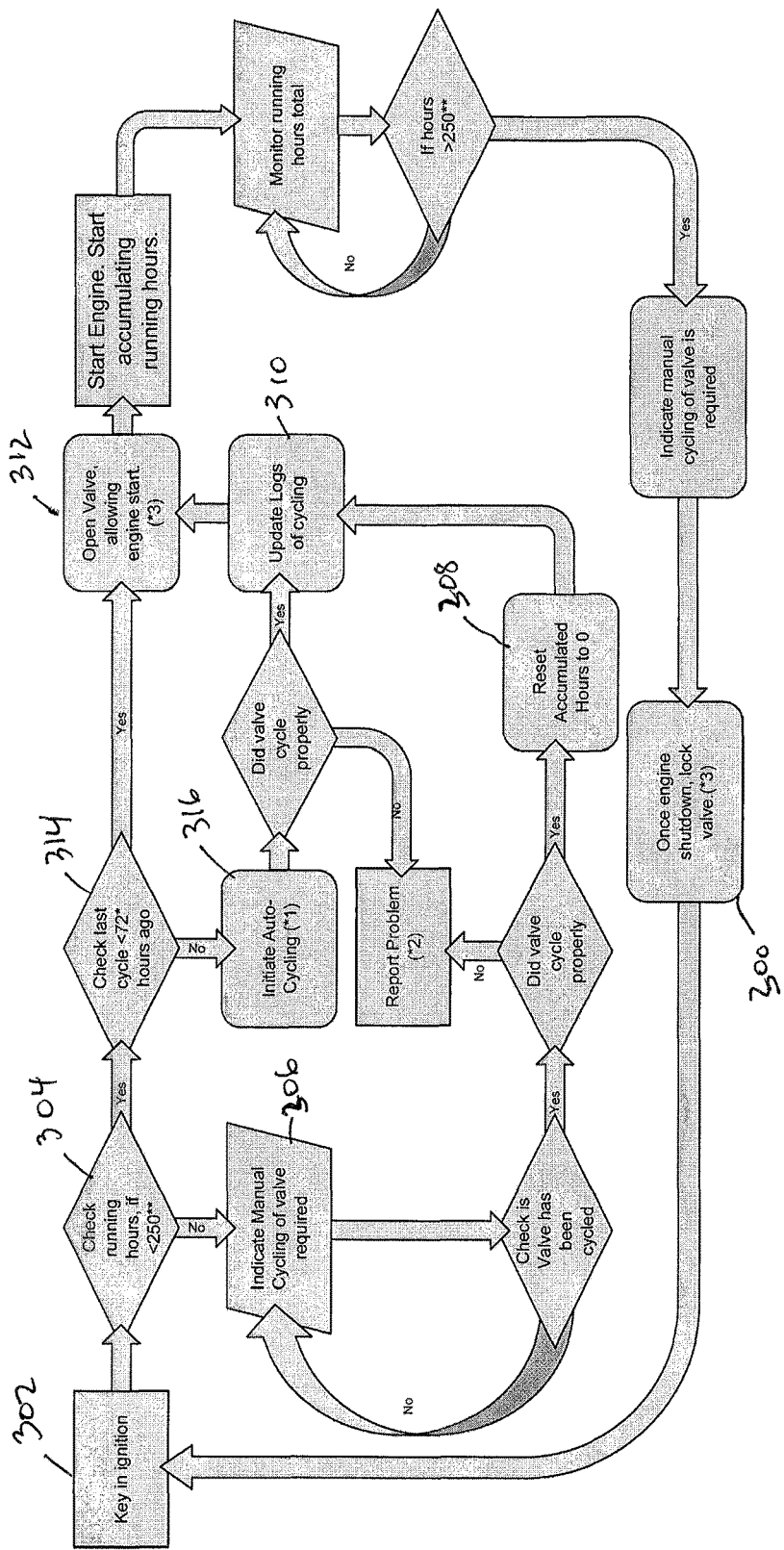
FIG. 3 shows a schematic flowchart of an alternative method of the present invention.

If the total running hours does not exceed the predetermined value, the controller may then check the total elapsed time since the last valve cycle (314). If the total elapsed time does not exceed a predetermined value, for example 72 hours, then the controller may then allow the valve to open (312), allowing the engine to start and run. If the total elapsed time exceeds the predetermined value, then the controller may initiate a process (316) or step (100) in FIG. 2, where the controller may confirm that the engine is not running, that battery voltage is sufficient and that the engine has been off for a sufficient period of time, or such other checks that may be desirable before cycling the valve. In one embodiment, the confirmation process (316) may comprise the steps shown in FIG. 2, or a portion of those steps. The controller may then cycle the valve or prompt the user to manually cycle the valve. If the valve cycled properly, the elapsed time clock is then reset to zero, the log updated appropriately (310) and the valve is opened (312) to allow the engine to start and run.

If the valve did not cycle properly, then the failure event may be recorded in the log (210), and a message may be displayed or transmitted regarding such failure (218). In one embodiment, the failure event may cause the controller to prevent the valve from opening, thereby preventing starting and running of the engine.

Alternatively, the controller may cause a message may be displayed or the vehicle operator notified that valve actuation is required and prompted to initiate a manual trigger for cycling the valve.

If the system permits the engine to start and run, the run time clock and the elapsed time clocks then add to the cumulative run time and the elapsed time recorded to date respectively, or if either clock, or both clocks have been reset to zero by a successful cycling of the valve, the clocks operate to log engine run time and elapsed time from that point forward.

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of periodically cycling an air shutoff valve on an engine, wherein the valve is capable of shutting down the engine, the method comprising the steps of:
   (a) determining elapsed time since the last valve cycle;
   (b) determining cumulative run time of the engine since the last valve cycle; and
   (c) if either the elapsed time or cumulative run time exceeds a predetermined value, initiating a valve cycle.

2. The method of claim 1 comprising the further step of confirming the engine is not running and that a battery voltage is sufficient before initiating a valve cycle.

3. The method of claim 1 wherein the valve is automatically cycled or a user may be prompted to manually cycle the valve.

4. The method of claim 3 further comprising the step of determining whether or not the valve has successfully cycled after the valve cycle is initiated, and writing a successful valve cycle event or an unsuccessful valve cycle attempt to a log.

5. The method of claim 4 further comprising the step of notifying a user by displaying or transmitting a message of the successful valve cycle event or the unsuccessful valve cycle attempt.

6. A valve maintenance system comprising a valve controller connected to an air shutoff valve on an engine, wherein the valve is capable of shutting down the engine, an elapsed time clock and an engine run time clock, the controller programmed to initiate a valve cycle upon a pre-determined length of time elapsing since the last valve cycle; or upon a cumulative run time of the engine since the last valve cycle exceeding a pre-determined value.

7. The system of claim 6 wherein the controller is connected to at least one sensor comprising an RPM detector or an ignition switch controller, and a battery voltage sensor, and the controller is programmed to confirm that the engine is not running and that a battery voltage is sufficient before initiating the valve cycle.

8. The system of claim 7 wherein the controller is programmed to cycle the valve automatically.

9. The system of claim 7 wherein the controller comprises a communication module programmed to display a prompt or transmit a message to a user to manually cycle the valve.

10. The system of claim 7 comprising a memory comprising an event log, wherein the controller is programmed to write successful valve cycle events or unsuccessful valve cycle attempts to the log.

11. The system of claim 10 wherein the controller comprises a communication module programmed to display or transmit a message to a user informing of the successful valve cycle events or unsuccessful valve cycle attempts.

* * * * *